(12) United States Patent
Naito et al.

(10) Patent No.: US 11,731,006 B2
(45) Date of Patent: Aug. 22, 2023

(54) GOLF BALL

(71) Applicant: Sumitomo Rubber Industries, Ltd., Kobe (JP)

(72) Inventors: Yasuo Naito, Kobe (JP); Yuko Oka, Kobe (JP); Shimpei Oyama, Kobe (JP); Tetsuro Abe, Kobe (JP); Kazuyoshi Shiga, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 164 days.

(21) Appl. No.: 16/719,349

(22) Filed: Dec. 18, 2019

(65) Prior Publication Data
US 2020/0197754 A1   Jun. 25, 2020

(30) Foreign Application Priority Data

Dec. 19, 2018  (JP) .................................. 2018-236983
Aug. 28, 2019  (JP) .................................. 2019-155871

(51) Int. Cl.
*A63B 37/14* (2006.01)
*A63B 37/00* (2006.01)

(52) U.S. Cl.
CPC .... *A63B 37/0037* (2013.01); *A63B 37/00221* (2020.08); *A63B 37/0024* (2013.01)

(58) Field of Classification Search
CPC .................................................... A63B 37/022
See application file for complete search history.

(56) References Cited

U.S. PATENT DOCUMENTS

| 5,601,880 A | * | 2/1997 | Schwarte | ............... | B05D 7/532 |
| | | | | | 427/407.1 |
| 6,448,326 B1 | * | 9/2002 | Mayer | ............... | C08G 18/0823 |
| | | | | | 524/507 |
| 2006/0025241 A1 | * | 2/2006 | Endo | ................. | A63B 37/0003 |
| | | | | | 473/371 |
| 2011/0053708 A1 | * | 3/2011 | Isoagawa | ........... | A63B 37/0023 |
| | | | | | 473/376 |

(Continued)

FOREIGN PATENT DOCUMENTS

| EP | 3492149 A1 | 6/2019 |
| EP | 3492150 A1 | 6/2019 |

(Continued)

OTHER PUBLICATIONS

Extended European Search Report for European Application No. 19213065.6, dated May 25, 2020.

*Primary Examiner* — Eugene L Kim
*Assistant Examiner* — Matthew B Stanczak
(74) *Attorney, Agent, or Firm* — Birch, Stewart, Kolasch & Birch, LLP

(57) ABSTRACT

An object of the present invention is to provide a novel golf ball having excellent spin performance on approach shots. The present invention provides a golf ball comprising a golf ball body and a paint film composed of at least one layer and formed on a surface of the golf ball body, wherein a base resin constituting an outermost layer of the paint film is a polyurethane obtained by a reaction between (A) a polyol composition and (B) a polyisocyanate composition, and a loss modulus (E") at the temperature of −50° C. obtained by measuring a dynamic viscoelasticity of the polyurethane is $1.00 \times 10^8$ Pa or more.

17 Claims, 1 Drawing Sheet

(56) References Cited

U.S. PATENT DOCUMENTS

| | | | |
|---|---|---|---|
| 2011/0244989 A1 | 10/2011 | Tarao et al. | |
| 2013/0072324 A1* | 3/2013 | Tarao | A63B 37/0003 473/378 |
| 2013/0203524 A1* | 8/2013 | Tarao | A63B 37/0077 473/378 |
| 2013/0324318 A1* | 12/2013 | Isogawa | A63B 37/0044 473/373 |
| 2013/0331205 A1* | 12/2013 | Tarao | C08G 18/7831 473/378 |
| 2015/0182804 A1* | 7/2015 | Tarao | A63B 37/0074 473/374 |
| 2015/0273276 A1* | 10/2015 | Isogawa | A63B 37/0037 473/374 |
| 2016/0136484 A1* | 5/2016 | Inoue | A63B 37/0031 473/377 |
| 2016/0184649 A1* | 6/2016 | Matsuyama | C09D 5/22 473/378 |
| 2016/0184650 A1* | 6/2016 | Tachibana | A63B 37/0022 473/373 |
| 2016/0184654 A1* | 6/2016 | Matsuyama | C09D 175/08 473/378 |
| 2017/0340922 A1 | 11/2017 | Inoue et al. | |
| 2018/0178075 A1* | 6/2018 | Tarao | A63B 37/0022 |

FOREIGN PATENT DOCUMENTS

| | | |
|---|---|---|
| JP | 2011-67595 A | 4/2011 |
| JP | 2011-217820 A | 11/2011 |
| JP | 2014-14383 A | 1/2014 |
| JP | 2014-14384 A | 1/2014 |
| JP | 2017-209298 A | 11/2017 |

\* cited by examiner

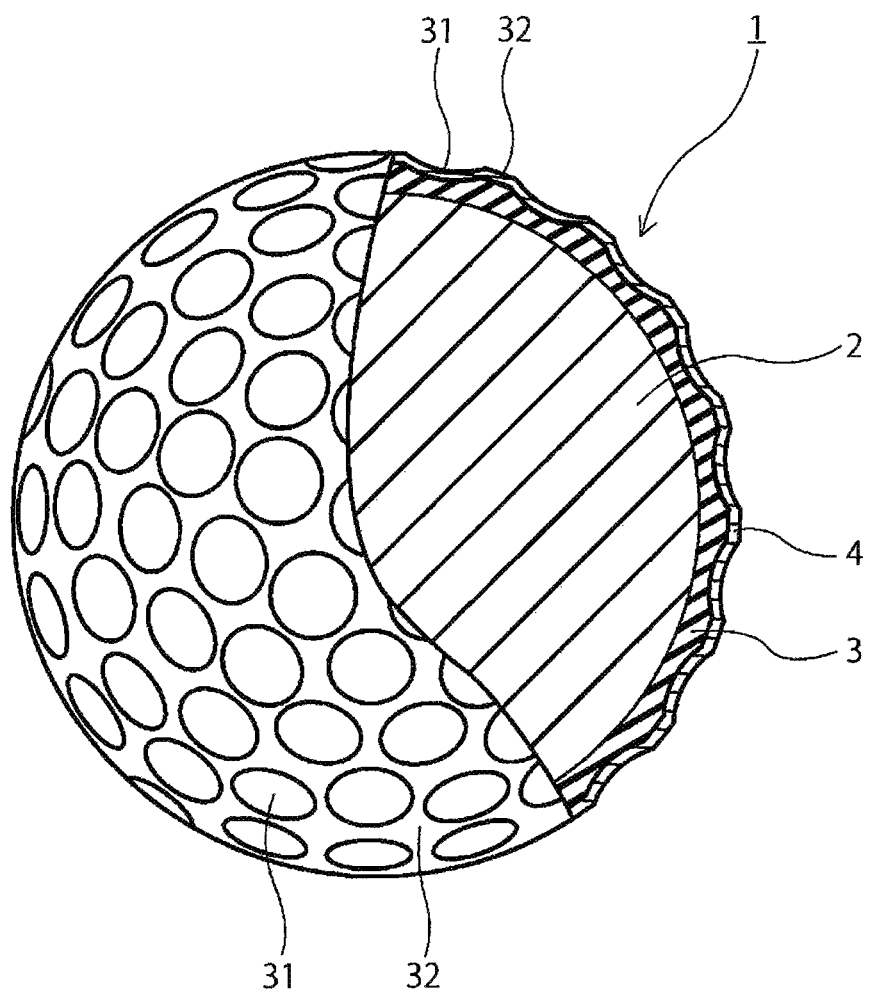

GOLF BALL

FIELD OF THE INVENTION

The present invention relates to a golf ball comprising a paint film.

DESCRIPTION OF THE RELATED ART

A paint film is formed on a surface of a golf ball body. It has been proposed to improve properties of the golf ball by improving the paint film.

JP 2011-67595 A discloses a golf ball comprising a core, a cover disposed outside the core, and a paint layer disposed outside the cover, wherein the cover has a Shore D hardness of 61 or less, and the paint layer has a martens hardness of 2.0 mgf/µm² or less.

JP 2011-217820 A discloses a golf ball comprising a golf ball body and a paint film formed on a surface of the golf ball body, wherein the paint film has a martens hardness of 2.0 mgf/µm² or less, and a ratio (50% modulus/10% modulus) of 50% modulus of the paint film to 10% modulus of the paint film is 1.6 or more.

JP 2014-14383 A discloses a golf ball comprising a golf ball body and a paint film formed on a surface of the golf ball body, wherein a storage modulus (E') of the paint film at a temperature range of from 120° C. to 150° C. is $1.00 \times 10^7$ dyn/cm² or more and $1.00 \times 10^8$ dyn/cm² or less, and a loss tangent (tan δ) of the paint film at 10° C. is 0.050 or more, wherein the storage modulus (E') and the loss tangent (tan δ) are measured with a dynamic viscoelasticity measuring apparatus under specific conditions.

JP 2017-209298 A discloses a golf ball comprising a golf ball body and a paint film covering the golf ball body, wherein a loss tangent tan δ obtained by measuring a dynamic viscoelasticity of the paint film has a peak temperature of 50° C. or less and a peak height of less than 0.8.

SUMMARY OF THE INVENTION

In the conventional technology, a soft paint film enhances the spin performance on approach shots. However, there is a limit to softening the paint film. If the paint film is made excessively soft for enhancing the spin performance on approach shots, the intrinsic function of the paint film deteriorates. Thus, a method of enhancing the spin performance other than the method of softening the paint film is desired. The present invention has been made in view of the abovementioned circumstances, and an object of the present invention is to provide a novel golf ball having excellent spin performance on approach shots.

The present invention provides a golf ball comprising a golf ball body and a paint film composed of at least one layer and formed on a surface of the golf ball body, wherein a base resin constituting an outermost layer of the paint film is a polyurethane obtained by a reaction between (A) a polyol composition and (B) a polyisocyanate composition, and a loss modulus (E") at the temperature of −50° C. obtained by measuring a dynamic viscoelasticity of the polyurethane under following conditions is $1.00 \times 10^8$ Pa or more:

<measurement conditions>
measuring mode: sine wave tensile mode
measuring temperature range: −120° C. to 100° C.
temperature increasing rate: 3° C./min
oscillation frequency: 10 Hz
measuring strain: 0.05%.

When the hitting speed on approach shots is 16 m/s, and the convex-concave of the face land portion of the wedge is several micrometers, the vibration the paint film of the golf ball receives on approach shots is $10^7$ Hz. According to the time-temperature conversion rule, the dynamic viscoelasticity of the paint film measured at normal temperature and the vibration of $10^7$ Hz is converted to the dynamic viscoelasticity measured at the temperature of −50° C. and a frequency of 10 Hz. The inventors of the present invention have found that controlling the loss modulus measured at the temperature of −50° C. and the frequency of 10 Hz improves the spin performance on approach shots, and thus has accomplished the present invention.

According to the present invention, a golf ball having excellent spin performance on approach shots is obtained.

BRIEF DESCRIPTION OF THE DRAWINGS

The FIGURE is a partially cutaway cross-sectional view of a golf ball according to one embodiment of the present invention.

DESCRIPTION OF THE PREFERRED EMBODIMENT

The present invention provides a golf ball comprising a golf ball body and a paint film composed of at least one layer and formed on a surface of the golf ball body, wherein a base resin constituting an outermost layer of the paint film is a polyurethane obtained by a reaction between (A) a polyol composition and (B) a polyisocyanate composition, and a loss modulus (E") at the temperature of −50° C. obtained by measuring a dynamic viscoelasticity of the polyurethane under following conditions is $1.00 \times 10^8$ Pa or more:

<measurement conditions>
measuring mode: sine wave tensile mode
measuring temperature range: −120° C. to 100° C.
temperature increasing rate: 3° C./min
oscillation frequency: 10 Hz
measuring strain: 0.05%.

If the polyurethane constituting the outermost layer of the paint film of the golf ball has a loss modulus (E") of $1.00 \times 10^8$ Pa or more at the temperature of −50° C., the obtained golf ball has excellent spin performance on approach shots.

In the present invention, the loss modulus (E") at the temperature of −50° C. obtained by measuring the dynamic viscoelasticity of the polyurethane constituting the outermost layer of the paint film of the golf ball under following conditions, is $1.00 \times 10^8$ Pa or more.

<measurement conditions>
measuring mode: sine wave tensile mode
measuring temperature range: −120° C. to 100° C.
temperature increasing rate: 3° C./min
oscillation frequency: 10 Hz
measuring strain: 0.05%.

From the viewpoint of enhancing the spin performance on approach shots, the loss modulus (E") is preferably $1.00 \times 10^8$ Pa or more, more preferably $1.20 \times 10^8$ Pa or more, and is preferably $1.00 \times 10^9$ Pa or less, more preferably $8.00 \times 10^8$ Pa or less, and even more preferably $6.00 \times 10^8$ Pa or less.

In the present invention, the storage modulus (E') at the temperature of 0° C. obtained by measuring the dynamic viscoelasticity of the polyurethane constituting the outermost layer of the paint film of the golf ball under the above conditions, is $0.50 \times 10^8$ Pa or more and $15 \times 10^8$ Pa or less. The contact time between the golf ball and the wedge face on approach shots is about five hundreds micro seconds. This means that the paint film digs into the score lines of the wedge about 2000 times a second (=2000 Hz). According to the time-temperature conversion rule, the dynamic viscoelasticity of the paint film measured at normal temperature and the vibration of 2000 Hz corresponds to the dynamic viscoelasticity measured at 0° C. and a frequency of 10 Hz. Thus, inventors of the present invention have focused on the dynamic viscoelasticity measured at 0° C. and a frequency of 10 Hz. If the polyurethane having the storage modulus (E') falling within the above range is used for the paint film, the paint film tends to more dig into the score lines of the wedge. As a result, the spin performance is enhanced.

From the viewpoint of enhancing the spin performance on approach shots, the storage modulus (E') is preferably $1.0 \times 10^8$ Pa or more, more preferably $2.0 \times 10^8$ Pa or more, and is preferably $13 \times 10^8$ Pa or less, more preferably $9.0 \times 10^8$ Pa or less.

The 10% elastic modulus of the paint film covering the golf ball body according to the present invention is preferably 130 kgf/cm$^2$ (12.7 MPa) or less, more preferably 120 kgf/cm$^2$ (11.8 MPa) or less, and even more preferably 110 kgf/cm$^2$ (10.8 MPa) or less. If the 10% elastic modulus of the paint film is 130 kgf/cm$^2$ (12.7 MPa) or less, the paint film is soft and thus the spin rate on approach shots increases. The lower limit of the 10% elastic modulus of the paint film is not particularly limited, but it is preferably 2 kgf/cm$^2$ (0.2 MPa), more preferably 4 kgf/cm$^2$ (0.4 MPa). This is because if the 10% elastic modulus is excessively low, the paint film is so soft that a tackiness feeling remains, and the feeling is poor.

The base resin constituting the outermost layer of the paint film is a polyurethane obtained by a reaction between a polyol composition and a polyisocyanate composition. First, the polyol composition and the polyisocyanate composition will be explained.

The polyol composition contains a polyol having at least two hydroxyl groups. Examples of the polyol include a low molecular weight polyol having a molecular weight of less than 500 and a high molecular weight polyol having an average molecular weight of 500 or more. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. Examples of the high molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; a urethane polyol; and an acrylic polyol. The polyol may be used solely or as a mixture of at least two of them.

The polyol composition preferably contains a urethane polyol. The amount of the urethane polyol in the polyol contained in the polyol composition is preferably 60 mass % or more, more preferably 70 mass % or more, and even more preferably 80 mass % or more. It is also preferable that the polyol of the polyol composition consists of the urethane polyol.

The urethane polyol is a compound having a plurality of urethane bonds in the molecule and having two or more hydroxyl groups in one molecule. Examples of the urethane polyol include a urethane prepolymer obtained by a reaction between a polyol and a polyisocyanate under a condition that the amount of hydroxyl groups in the polyol is excessive to the amount of isocyanate groups in the polyisocyanate. The urethane polyol preferably includes a polyether diol having a number average molecular weight in a range of from 800 to 3000 as a polyol component. If the urethane polyol including such polyol component is used, the obtained paint film is softer, and the spin performance is better.

Examples of the polyol component constituting the urethane polyol include a low molecular weight polyol component having a molecular weight of less than 500 and a high molecular weight polyol component having an average molecular weight of 500 or more. Examples of the low molecular weight polyol component include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. Examples of the high molecular weight polyol component include a polyether diol, and a polyester diol. The polyol component may be used solely or as a mixture of at least two of them.

Examples of the polyether diol constituting the urethane polyol include polyoxyethylene glycol, polyoxypropylene glycol, and polyoxytetramethylene glycol. Among them, polyoxytetramethylene glycol is preferable.

The number average molecular weight of the polyether diol constituting the urethane polyol is preferably 800 or more, more preferably 900 or more, and even more preferably 1000 or more, and is preferably 3000 or less, more preferably 2000 or less, and even more preferably 1500 or less. If the number average molecular weight of the polyether diol is 800 or more, the distance between crosslinking points in the paint film becomes long and the paint film becomes soft, thus the spin performance is enhanced. If the number average molecular weight of the polyether diol is 3000 or less, the distance between crosslinking points in the paint film does not become excessively long, thus the stain resistance of the paint film becomes better. It is noted that the number average molecular weight of the polyol component can be measured, for example, by gel permeation chromatography (GPC), using polystyrene as a standard material, tetrahydrofuran as an eluate, and an organic solvent system GPC column (e.g. "Shodex (registered trademark) KF series" available from Showa Denko K.K.) as a column.

The urethane polyol preferably includes a triol component and the diol component as the polyol component. As the triol component, trimethylolpropane is preferable. The mixing ratio of the triol component to the diol component (triol component/diol component) is preferably 1.0 or more, more preferably 1.2 or more, and is preferably 2.6 or less, more preferably 2.4 or less, in a molar ratio of OH group.

The polyisocyanate component constituting the urethane polyol is not particularly limited, as long as the polyisocyanate component has at least two isocyanate groups. Examples of the polyisocyanate component include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylenediisocyanate (TMXDI), and para-phenylene diisocyanate (PPDI); and an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). These polyisocyanates may be used solely or as a mixture of at least two of them.

The amount of the polyether diol having the number average molecular weight in the range of from 800 to 3000 in the urethane polyol is preferably 55 mass % or more, more preferably 58 mass % or more, and even more preferably 60 mass % or more. The polyether diol having the number average molecular weight in the range of from 800 to 3000 forms a soft segment in the paint film. Therefore, if the amount of the polyether diol is 55 mass % or more, the obtained golf ball has further enhanced spin performance.

The number average molecular weight of the urethane polyol is preferably 5000 or more, more preferably 5300 or more, and even more preferably 5500 or more, and is preferably 20000 or less, more preferably 18000 or less, and even more preferably 16000 or less. If the number average molecular weight of the urethane polyol is 5000 or more, the distance between crosslinking points in the paint film becomes long and the paint film becomes soft, thus the spin performance is enhanced. If the number average molecular weight of the urethane polyol is 20000 or less, the distance between crosslinking points in the paint film does not become excessively long, thus the stain resistance of the paint film becomes better.

The hydroxyl value of the urethane polyol is preferably 10 mgKOH/g or more, more preferably 15 mgKOH/g or more, and even more preferably 20 mgKOH/g or more, and is preferably 200 mgKOH/g or less, more preferably 190 mgKOH/g or less, and even more preferably 180 mgKOH/g or less.

The hydroxyl value of the polyol contained in the polyol composition is preferably 10 mgKOH/g or more, more preferably 15 mgKOH/g or more, and even more preferably 20 mgKOH/g or more, and is preferably 400 mgKOH/g or less, preferably 300 mgKOH/g or less, more preferably 200 mgKOH/g or less, even more preferably 170 mgKOH/g or less, and most preferably 160 mgKOH/g or less. If the hydroxyl value of the polyol component falls within the above range, the paint film has enhanced adhesion to the golf ball body. It is noted that in the present invention, the hydroxyl value can be measured according to JIS K 1557-1, for example, by an acetylation method.

Specific examples of the polyol include 121B available from Wayaku Paint Co. Ltd.; NIPPOLLAN 800 and NIPPOLLAN 1100 available from Nippon Polyurethane Industry Co., Ltd.; Burnock D6-627, Burnock D8-436, Burnock D8-973 and Burnock 11-408 available from DIC corporation; Desmophen 650MPA, Desmophen 670, Desmophen 1150 and Desmophen A160X available from Sumika Bayer Urethane Co., Ltd.; and HARIACRON 2000 and HARIACRON 8500H available from Harima Chemicals Group, Inc.

Next, the polyisocyanate composition will be explained. The polyisocyanate composition contains one or at least two polyisocyanates. Examples of the polyisocyanate include a compound having at least two isocyanate groups.

Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), and para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI); and a triisocyanate such as an allophanate-modified product, biuret-modified product, isocyanurate-modified product or adduct-modified product of these polyisocyanates. In the present invention, as the polyisocyanate, only one polyisocyanate is preferably used, but two or more polyisocyanates may be used. When only one polyisocyanate is used, an isocyanurate-modified product of HDI, an adduct product of HDI, or a biuret-modified product of HDI are preferable, the isocyanurate-modified product of HDI is most preferable. This is because the loss modulus of the obtained polyurethane at the temperature of −50° C. is larger.

The allophanate-modified product is, for example, a triisocyanate obtained by further reacting a diisocyanate with a urethane bond formed through a reaction between a diisocyanate and a low molecular weight diol. The adduct product is a triisocyanate obtained through a reaction between a diisocyanate and a low molecular weight triol such as trimethylolpropane or glycerin. The biuret-modified product is, for example, a triisocyanate having a biuret bond represented by the following chemical formula (1). The isocyanurate-modified product of diisocyanate is, for example, a triisocyanate represented by the following chemical formula (2).

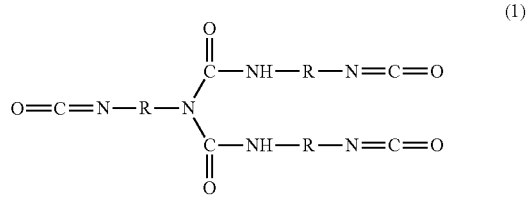

(1)

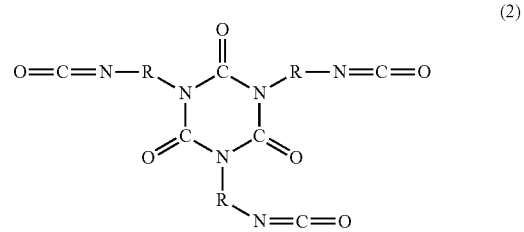

(2)

[In the chemical formulae (1) and (2), R represents a residue where isocyanate groups are removed from the diisocyanate.]

The polyisocyanate composition preferably contains the triisocyanate. The amount of the triisocyanate in the polyisocyanate contained in the polyisocyanate composition is preferably 50 mass % or more, more preferably 60 mass % or more, and even more preferably 70 mass % or more. It is most preferable that the polyisocyanate in the polyisocyanate composition consists of the triisocyanate.

The amount (NCO %) of the isocyanate group of the polyisocyanate contained in the polyisocyanate composition is preferably 0.5 mass % or more, more preferably 1 mass % or more, and even more preferably 2 mass % or more, and is preferably 45 mass % or less, more preferably 40 mass % or less, and even more preferably 35 mass % or less. It is noted that the amount (NCO %) of the isocyanate group of the polyisocyanate can be represented by 100×[mole number of isocyanate group in polyisocyanate×42 (molecular weight of NCO)]/[total mass (g) of polyisocyanate].

Specific examples of the polyisocyanate include Burnock D-800, Burnock DN-950, and Burnock DN-955 available from DIC corporation; Desmodur N75MPA/X, Desmodur N3300, Desmodur L75 (C), and Sumidur E21-1 available from Sumika Bayer Urethane Co., Ltd.; Coronate HX, and Coronate HK available from Japan Polyurethane Industry Co. Ltd.; Duranate 24A-100, Duranate 21S-75E, Duranate TPA-100, and Duranate TKA-100 available from Asahi Kasei Chemicals Corporation; and VESTANAT T1890 available from Degussa Co., Ltd.

The base resin constituting the outermost layer of the paint film of the golf ball according to the present invention contains the polyurethane obtained by the reaction between the polyol composition and the polyisocyanate composition. In the reaction between the polyol composition and the polyisocyanate composition, the molar ratio (NCO group/OH group) of the isocyanate group (NCO group) included in the polyisocyanate composition to the hydroxyl group (OH group) included in the polyol composition is preferably 0.7 or more, more preferably 1.0 or more, and even more preferably 1.3 or more. If the molar ratio (NCO group/OH group) is 0.7 or more, the crosslinking density becomes higher, and the obtained paint film has better stain resistance. In addition, if the molar ratio (NCO group/OH group) is excessively high, the amount of the isocyanate group becomes excessive, and thus the obtained paint film may become hard and fragile, and the appearance thereof may deteriorate. Thus, the molar ratio (NCO group/OH group) is preferably 3.5 or less, more preferably 3.0 or less, and even more preferably 2.5 or less. It is noted that the reason why the appearance of the obtained paint film deteriorates if the amount of the isocyanate group is excessive in the paint is considered that if the amount of the isocyanate group is excessive, the moisture in air and the isocyanate group react more frequently, thereby generating a lot of carbon dioxide gas.

The paint film of the golf ball according to the present invention is preferably formed from a paint containing the polyol composition and the polyisocyanate composition. Examples of the paint include a so-called two-component curing type paint having a first agent containing the polyol composition, and a second agent containing the polyisocyanate composition. The paint may be either a waterborne paint mainly containing water as a dispersion medium or an organic solvent-based paint containing an organic solvent as a dispersion medium. In the case of the solvent-based paint, examples of the preferable solvent include toluene, isopropyl alcohol, xylene, methyl ethyl ketone, methyl ethyl isobutyl ketone, ethylene glycol monomethyl ether, ethylbenzene, propylene glycol monomethyl ether, isobutyl alcohol, and ethyl acetate.

In the two-component curing type paint, the total amount of the solid component of the first agent and second agent is preferably 30 mass % or more, more preferably 31 mass % or more, and even more preferably 32 mass % or more, and is preferably 45 mass % or less, more preferably 44 mass % or less, and even more preferably 43 mass % or less. If the amount of the solid component is 30 mass % or more, it is easy to uniformly apply the paint, thus the paint film has a more uniform thickness, and if the amount of the solid component is 45 mass % or less, the paint has a better leveling property and the convex-concave of the paint film surface is decreased, thus the golf ball has a better appearance.

The paint may further contain additives generally contained in a paint for a golf ball, such as a filler, an ultraviolet absorber, an antioxidant, a light stabilizer, a fluorescent brightener, an anti-blocking agent, a leveling agent, a slip agent, and a viscosity modifier, where necessary.

Next, the method of applying the curing type paint according to the present invention will be explained. The method of applying the curing type paint is not particularly limited, a conventional method can be adopted, and examples thereof include a spray coating and electrostatic coating.

In the case of performing the spray coating with an air gun, the polyol component and the polyisocyanate component are fed with respective pumps and continuously mixed with a line mixer located in the stream line just before the air gun, and the obtained mixture is air-sprayed. Alternatively, the polyol and the polyisocyanate are air-sprayed respectively with an air spray system provided with a device for controlling the mixing ratio thereof. The paint application may be conducted by spraying the paint one time or over-spraying the paint multiple times.

The curing type paint applied on the golf ball body is dried, for example, at a temperature in a range of from 30° C. to 70° C. for 1 hour to 24 hours, to form the paint film.

The golf ball according to the present invention is not particularly limited, as long as the golf ball comprises a golf ball body and a paint film composed of at least one layer and formed on a surface of the golf ball body, wherein the base resin constituting the outermost layer of the paint film is the polyurethane obtained by a reaction between (A) the polyol composition and (B) the polyisocyanate composition.

In the case that the paint film is single layered, the base resin of the single layered paint film is the polyurethane obtained by a reaction between (A) the polyol composition and (B) the polyisocyanate composition.

In the case that the paint film has a multiple layered structure composed of at least two layers, the base resin constituting the outermost layer of the paint film is the polyurethane obtained by a reaction between (A) the polyol composition and (B) the polyisocyanate composition. Examples of the base resin constituting the layer other than the outermost layer include, but are not limited to, a polyurethane, an epoxy resin, and an acrylic resin.

In a more preferable embodiment of the present invention, the golf ball comprises a golf ball body and a dual layered paint film formed on a surface of the golf ball body, wherein the base resin constituting the outer layer of the paint film is the polyurethane obtained by a reaction between (A) the polyol composition and (B) the polyisocyanate composition.

The thickness of the paint film of the golf ball according to the present invention is not particularly limited, and is preferably 5 μm or more, more preferably 6 μm or more, even more preferably 10 μm or more, and particularly preferably 15 μm or more. This is because if the thickness of the paint film is less than 5 μm, the paint film tends to be easily worn off due to the continued use of the golf ball, and thickening the paint film increases the spin rate on approach shots. Further, the thickness of the paint film is preferably 50 μm or less, more preferably 45 μm or less, and even more preferably 40 μm or less. This is because if the thickness of the paint film exceeds 50 μm, the dimple effect may be lowered, and the flight performance of the golf ball tends to be lowered. The thickness of the paint film can be measured, for example, by observing the cross section of the golf ball with a microscope (VHX-1000 available from Keyence Corporation). It is noted that in the case that the paint film has a multiple layered structure, a total thickness of the formed paint film preferably falls within the above range.

The golf ball according to the present invention is not particularly limited, as long as the golf ball comprises a golf ball body and a paint film composed of at least one layer and formed on a surface of the golf ball body. The construction of the golf ball body is not particularly limited, and the golf ball body may be a one-piece golf ball, a two-piece golf ball, a multi-piece golf ball such as a three-piece golf ball, a four-piece golf ball, a five-piece golf ball and a golf ball comprising more than five pieces, or a wound golf ball. The present invention can be applied appropriately to any one of the above golf balls.

The FIGURE is a partially cutaway cross-sectional view showing a golf ball according to one embodiment of the present invention. A golf ball 1 comprises a spherical core 2, a cover 3 covering the spherical core 2, and a paint film 4 formed on a surface of the cover 3. On the surface of the cover 3, a plurality of dimples 31 are formed. On the surface of the cover 3, a part other than the dimples 31 is a land 32.

The golf ball body preferably comprises a core and a cover covering the core. It is preferable that the slab hardness of the cover composition is appropriately set in accordance with the desired performance of the golf ball. For example, in case of a so-called distance golf ball focusing on the flight distance, the slab hardness of the cover composition is preferably 50 or more, more preferably 55 or more, and is preferably 80 or less, more preferably 70 or less in Shore D hardness. If the slab hardness of the cover composition is 50 or more, the obtained golf ball has a high launch angle and low spin rate on driver shots and iron shots, and thus travels a greater flight distance. In addition, if the slab hardness of the cover composition is 80 or less, the obtained golf ball has better durability. Further, in case of a so-called spin golf ball focusing on the controllability, the slab hardness of the cover composition is preferably less than 50, more preferably 20 or more, and even more preferably 25 or more in Shore D hardness. If the slab hardness of the cover composition is less than 50 in Shore D hardness, the spin rate on approach shots is higher. In addition, if the slab hardness is 20 or more, the abrasion resistance is enhanced.

The cover material constituting the cover is not particularly limited, and examples thereof include various resins such as an ionomer resin, a polyester resin, a urethane resin (e.g. a thermoplastic urethane resin and a two-component curing type urethane resin), and a polyamide resin; a thermoplastic polyamide elastomer having a trade name of "Pebax (registered trademark) (e.g. "Pebax 2533")" available from Arkema Inc.; a thermoplastic polyester elastomer having a trade name of "Hytrel (registered trademark) (e.g. "Hytrel 3548" and "Hytrel 4047")" available from Du Pont-Toray Co., Ltd.; a thermoplastic polyurethane elastomer having a trade name of "Elastollan (registered trademark) (e.g. "Elastollan XNY97A")" available from BASF Japan Ltd.; and a thermoplastic styrene elastomer having a trade name of "Rabalon (registered trademark)" and a thermoplastic polyester elastomer having a trade name of "Primalloy" both available from Mitsubishi Chemical Corporation. These cover materials may be used solely, or two or more of these cover materials may be used in combination.

In addition to the above resin component, the cover may further contain a pigment component such as a white pigment (e.g. titanium oxide), a blue pigment and a red pigment, a weight adjusting agent such as calcium carbonate and barium sulfate, a dispersant, an antioxidant, an ultraviolet absorber, a light stabilizer (e.g. bis(2,2,6,6-tetramethyl-4-piperidyl) sebacate), a fluorescent material or fluorescent brightener, or the like, as long as they do not impair the performance of the cover.

The method for molding the cover from the cover composition is not particularly limited, and examples thereof include a method of injection molding the cover composition directly onto the core; and a method of molding the cover composition into hollow shells, covering the core with a plurality of the hollow shells and compression molding the core with a plurality of the hollow shells (preferably a method of molding the cover composition into half hollow-shells, covering the core with two of the half hollow-shells and compression molding the core with two of the half hollow-shells). The golf ball body having the cover formed thereon is ejected from the mold, and as necessary, the golf ball body is preferably subjected to surface treatments such as deburring, cleaning, and sandblast. In addition, if desired, a mark may also be formed thereon.

The total number of the dimples formed on the cover is preferably 200 or more and 500 or less. If the total number of the dimples is less than 200, the dimple effect is hardly obtained, and if the total number of the dimples exceeds 500, the dimple effect is hardly obtained because the size of the respective dimples is small. The shape (shape in a plan view) of the dimples includes, for example, but is not limited to, a circle; a polygonal shape such as a roughly triangular shape, a roughly quadrangular shape, a roughly pentagonal shape, and a roughly hexagonal shape; and other irregular shape. The shape of the dimples may be employed solely, or two or more of the shapes may be employed in combination.

In the present invention, a ratio of the total area of all the dimples to the surface area of a phantom sphere is referred to as an occupation ratio. The phantom sphere is a golf ball (sphere) where no dimple exists. In the golf ball according to the present invention, the occupation ratio of the dimple is preferably 60% or more, more preferably 63% or more, and even more preferably 66% or more, and is preferably 90% or less, more preferably 87% or less, and even more preferably 84% or less. If the occupation ratio is excessively high, the paint film contributes little to the friction coefficient. In addition, if the occupation ratio is excessively low, the flight performance is lowered.

It is noted that the area of the dimple is an area of a region surrounded by the contour line of the dimple when the central point of the golf ball is viewed from infinity. In the case of a circular dimple, the area S is calculated by the following mathematical formula.

$$S=(Di/2)^2 \cdot \pi \;(Di\text{: the diameter of the dimple})$$

The golf ball preferably has a diameter in a range of from 40 mm to 45 mm. In light of satisfying the regulation of US Golf Association (USGA), the diameter is preferably 42.67 mm or more. In light of prevention of air resistance, the diameter is preferably 44 mm or less, more preferably 42.80 mm or less. The golf ball preferably has a mass of 40 g or more and 50 g or less. In light of obtaining greater inertia, the mass is preferably 44 g or more, more preferably 45.00 g or more. In light of satisfying the regulation of USGA, the mass is preferably 45.93 g or less.

Next, the center or core used for a wound golf ball, two-piece golf ball and multi-piece golf ball, and the one-piece golf ball body will be explained.

The center, core or the one-piece golf ball body may be formed from a conventionally known rubber composition (hereinafter sometimes simply referred to as "core rubber composition"). For example, the core or the one-piece golf ball body may be formed by heat pressing a rubber composition containing a base rubber, a co-crosslinking agent and a crosslinking initiator.

As the base rubber, particularly preferable is a high cis-polybutadiene having a cis-bond in a proportion of 40 mass % or more, more preferably 70 mass % or more, and even more preferably 90 mass % or more in view of its advantageous resilience. As the co-crosslinking agent, an α,β-unsaturated carboxylic acid having 3 to 8 carbon atoms or a metal salt thereof is preferable, and a metal salt of acrylic acid or a metal salt of methacrylic acid is more preferable. As the metal constituting the metal salt, zinc, magnesium, calcium, aluminum or sodium is preferable, and zinc is more preferable. The amount of the co-crosslinking agent is preferably 20 parts by mass or more and 50 parts by mass or less with respect to 100 parts by mass of the base rubber. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy) hexane, and di-t-butyl peroxide. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect to 100 parts by mass of the base rubber.

In addition, the core rubber composition may further contain an organic sulfur compound. As the organic sulfur compound, diphenyl disulfides, thiophenols, and thionaphthols are preferably used. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferable. The amount of the carboxylic acid and/or the salt thereof is preferably 1 part by mass or more and 40 parts by mass or less with respect to 100 parts by mass of the base rubber.

The core rubber composition may further contain a weight adjusting agent such as zinc oxide and barium sulfate, an antioxidant, or a colored powder, in addition to the base rubber, the co-crosslinking agent, the crosslinking initiator, and the organic sulfur compound. The molding conditions for heat pressing the core rubber composition may be appropriately set depending on the rubber formulation. Generally, the heat pressing is preferably carried out at the temperature of 130° C. to 200° C. for 10 to 60 minutes, or carried out in a two-step heating of heating at the temperature of 130° C. to 150° C. for 20 to 40 minutes followed by heating at the temperature of 160° C. to 180° C. for 5 to 15 minutes.

When the golf ball is a multi-piece golf ball such as a three-piece golf ball, a four-piece golf ball, a five-piece golf ball and a golf ball composed of more than five pieces, examples of the material for forming the intermediate layer disposed between the center or core and the outermost cover include a thermoplastic resin such as a polyurethane resin, an ionomer resin, a polyamide resin, and a polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product obtained by neutralizing at least a part of carboxyl groups of a copolymer composed of ethylene and an α,β-unsaturated carboxylic acid with a metal ion; and a product obtained by neutralizing at least a part of carboxyl groups of a ternary copolymer composed of ethylene, an α,β-unsaturated carboxylic acid and an α,β-unsaturated carboxylic acid ester with a metal ion. The intermediate layer may further contain a weight adjusting agent such as barium sulfate and tungsten, an antioxidant, a pigment, and the like. It is noted that the intermediate layer is sometimes referred to as an inner cover or an outer core, depending on the construction of the golf ball. The core may be composed of a single layer or multi-layers.

EXAMPLES

Next, the present invention will be described in detail by way of examples. However, the present invention is not limited to the examples described below. Various changes and modifications without departing from the spirit of the present invention are included in the scope of the present invention.

[Evaluation Methods]
(1) Measurement of Dynamic Viscoelasticity

The storage modulus E' and loss modulus E" of the paint film was measured under the following conditions.

Apparatus: Dynamic viscoelasticity measuring apparatus Rheogel-E4000 available from UBM CO., Ltd.

Test sample: A paint obtained by blending the base agent and the curing agent was dried and cured at the temperature of 40° C. for 4 hours to prepare a paint film having a thickness in a range of from 0.11 mm to 0.14 mm. The paint film was cut to prepare a test piece having a width of 4 mm and a distance between the clamps of 20 mm.

Measuring mode: sine wave tensile mode
Measuring temperature: −120° C. to 100° C.
Temperature increasing rate: 3° C./min
Measuring date capturing interval: 3° C.
Oscillation frequency: 10 Hz
Measuring strain: 0.05%

(2) 10% Elastic Modulus of Paint Film

The polyisocyanate composition and the polyol composition were blended to prepare a paint, and the obtained paint was dried and cured at the temperature of 40° C. for 4 hours to prepare a paint film. The paint film was punched into a dumbbell shape to prepare a test piece according to JIS-K7161. The properties of the paint film were measured with a tensile tester available from Shimadzu Corporation, and the elastic modulus at 10% elongation was calculated.

Thickness of test piece: 0.11-0.14 mm
Tensile speed: 50 mm/min (3) Dry Spin Rate Sd on Approach Shots (rpm)

A sand wedge (RTX-3(58°) available from Cleveland Golf Inc.) was installed on a swing machine available from Golf Laboratories, Inc. The golf ball was hit at a head speed of 16 m/sec, and the spin rate (rpm) thereof was measured by continuously taking a sequence of photographs of the hit golf ball. The measurement was conducted eight times for each golf ball, and the average value thereof was adopted as the spin rate.

(4) Rough Spin Rate Sr on Approach Shots from the Rough (rpm)

A sand wedge (RTX-3(58°) available from Cleveland Golf Inc.) was installed on a swing machine available from Golf Laboratories Inc. A golf ball having two pieces of wild grass attached on the surface was used, the golf ball was hit at a head speed of 16 m/s in a state that the wild grass was disposed between the face of the sand wedge and the golf ball, and the spin rate (rpm) was measured. A sequence of photographs of the hit golf ball were taken for measuring the spin rate. When the face of the sand wedge and the golf ball were contacted, the wild grass was attached to the golf ball with a cellophane tape such that the wild grass was perpendicular to the groove of the face. The measurement was conducted eight times for each golf ball, and the average value of the obtained data was calculated respectively.

[Production of Golf Ball]
1. Production of Center

The center rubber composition having the formulation shown in Table 1 was kneaded, and heat-pressed at the temperature of 170° C. for 20 minutes in upper and lower molds, each having a hemispherical cavity, to obtain a spherical center having a diameter of 39.7 mm. It is noted that the amount of barium sulfate was adjusted such that the ball had a mass of 45.3 g.

TABLE 1

| Center composition | | |
| --- | --- | --- |
| Formulation (parts by mass) | Polybutadiene | 100 |
| | Zinc acrylate | 35 |
| | Zinc oxide | 5 |
| | Barium sulfate | Appropriate amount |
| | Diphenyl disulfide | 0.5 |
| | Dicumyl peroxide | 0.9 |

Polybutadiene rubber: "BR730 (high-cis polybutadiene)" available from JSR Corporation Zinc acrylate: "ZN-DA90S" available from Nisshoku Techno Fine Chemical Co., Ltd.

Zinc oxide: "Ginrei R" available from Toho Zinc Co., Ltd.

Barium sulfate: "Barium Sulfate BD" available from Sakai Chemical Industry Co., Ltd.

Diphenyl disulfide: available from Sumitomo Seika Chemicals Co., Ltd.

Dicumyl peroxide: "Percumyl (register trademark) D" available from NOF Corporation 2. Preparation of Intermediate Layer Composition and Cover Composition The materials having the formulations shown in Tables 2 and 3 were mixed with a twin-screw kneading extruder to prepare the intermediate layer composition and the cover composition in a pellet form. The extruding conditions were a screw diameter of 45 mm, a screw rotational speed of 200 rpm, and a screw L/D=35, and the mixture was heated to 200° C. to 260° C. at the die position of the extruder.

TABLE 2

| Intermediate layer composition | | |
| --- | --- | --- |
| Formulation (parts by mass) | Surlyn 8945 | 55 |
| | Himilan AM7329 | 45 |
| | Titanium dioxide | 4 |

Surlyn (registered trademark) 8945: sodium ion-neutralized ethylene-methacrylic acid copolymer ionomer resin available from E. I. du Pont de Nemours and Company Himilan (registered trademark) AM7329: zinc ion-neutralized ethylene-methacrylic acid copolymer ionomer resin available from Du Pont-Mitsui Polychemicals Co., Ltd.

TABLE 3

| Cover composition | | |
| --- | --- | --- |
| Formulation (parts by mass) | Elastollan XNY82A | 100 |
| | Tinuvin 770 | 0.2 |
| | Titanium dioxide | 4 |
| | Ultramarine blue | 0.04 |
| Slab hardness (Shore D) | | 29 |

Elastollan (registered trademark) XNY82A: thermoplastic polyurethane elastomer available from BASF Japan Ltd.

Tinuvin (registered trademark) 770: bis(2,2,6,6-tetramethyl-4-piperidyl) sebacate available from BASF Japan Ltd.

3. Production of Spherical Core

The intermediate layer composition obtained above was directly injection molded onto the spherical center to produce the spherical core with the intermediate layer covering the center. The intermediate layer has a thickness of 1.0 mm. The upper and lower molds for molding have a semispherical cavity and a retractable hold pin for holding the spherical center. When molding the intermediate layer, the hold pin was protruded to hold the charged center, and the intermediate layer composition heated to 260° C. was injected in 0.3 second into the mold held under a pressure of 80 tons, and cooled for 30 seconds. The mold was opened and the spherical core was ejected from the mold.

4. Molding of Half Shell

The compression molding of half shells was conducted as follows. The obtained cover composition in the pellet form was charged into each of the depressed part of the lower mold for molding half shells one by one, and a pressure was applied to mold the half shells. The compression molding was conducted under the following conditions: a molding temperature of 170° C., a molding time of 5 minutes, and a molding pressure of 2.94 MPa.

5. Molding of Cover

The spherical core obtained above was concentrically covered with two of the half shells, and compression molding was conducted to form the cover having a thickness of 0.5 mm. The compression molding was conducted under the following conditions: a molding temperature of 145° C., a molding time of 2 minutes, and a molding pressure of 9.8 MPa.

6. Preparation of Paint

Preparation of First Agent (Polyol Composition)

Polyoxytetramethylene glycol (PTMG) and trimethylolpropane (TMP) were dissolved as the polyol component in a solvent (toluene/methyl ethyl ketone=1/2 in a mass ratio) such that the concentration of the polyol component was 50 mass %. Dibutyltin laurate was added as a catalyst into the above prepared solution in an amount of 0.1 mass % with respect to the solid component of the polyol component. While keeping the temperature of the polyol solution at 80° C., isophorone diisocyanate (IPDI) was added dropwise as the polyisocyanate component to the polyol solution and mixed. After finishing the addition of isophorone diisocyanate, stirring was continued until the isocyanate group disappeared. Then, the reaction liquid was cooled to the room temperature, and a solvent (toluene/methyl ethyl ketone=1/2 in a mass ratio) was added to prepare the urethane polyol (solid component content: 30 mass %). The composition and the like of each urethane polyol are shown in Table 4.

TABLE 4

| | | Urethane polyol No. | | | | |
|---|---|---|---|---|---|---|
| | | 1 | 2 | 3 | 4 | 5 |
| Component | Polyol component | PTMG TMP | PTMG TMP | PTMG TMP | PTMG TMP | PTMG TMP |
| | Polyisocyanate component | IPDI | IPDI | IPDI | IPDI | IPDI |
| Number average molecular weight of PTMG | | 650 | 850 | 1000 | 1500 | 2000 |
| TMP: PTMG (molar ratio of OH group) | | 1.8:1.0 | 1.8:1.0 | 1.8:1.0 | 1.8:1.0 | 1.8:1.0 |
| Molar ratio (NCO/OH) of NCO group of polyisocyanate component to OH group of polyol component | | 0.6 | 0.6 | 0.6 | 0.6 | 0.6 |
| Amount of PTMG (mass %) | | 54 | 61 | 65 | 73 | 78 |
| Hydroxyl value of solid component (mgKOH/g) | | 107.4 | 92.0 | 83.1 | 62.8 | 50.5 |
| Number average molecular weight | | 7356 | 10536 | 12354 | 15642 | 19023 |

Preparation of Second Agent (Polyisocyanate Composition)

Polyisocyanate composition No. 1: isocyanurate-modified product of hexamethylene diisocyanate (Sumidur N3300 available from Sumika Covestro Urethane Co., Ltd.)

Polyisocyanate composition No. 2: biuret-modified product of hexamethylene diisocyanate (Desmodur N3200A available from Sumika Covestro Urethane Co., Ltd.)

Polyisocyanate composition No. 3: adduct product of hexamethylene diisocyanate (Sumidur HT available from Sumika Covestro Urethane Co., Ltd.)

Polyisocyanate composition No. 4: isocyanurate-modified product of isophorone diisocyanate (Desmodur Z4470 available from Sumika Covestro Urethane Co., Ltd.)

Polyisocyanate composition No. 5: 30 parts by mass of an isocyanurate-modified product of hexamethylene diisocyanate (Duranate (registered trademark) TKA-100 (NCO amount: 21.7 mass %) available from Asahi Kasei Chemicals Corporation), 30 parts by mass of a biuret-modified product of hexamethylene diisocyanate (Duranate 21S-75E (NCO amount: 15.5 mass %) available from Asahi Kasei Chemicals Corporation), and 40 parts by mass of an isocyanurate-modified product of isophorone diisocyanate (Desmodur (registered trademark) Z 4470 (NCO amount: 11.9 mass %) available from Bayer Co., Ltd.) were mixed.

A mixed solvent of methyl ethyl ketone, n-butyl acetate and toluene was further added as a solvent in the polyisocyanate compositions No. 1 to 5, to adjust the concentration of the polyisocyanate component to 60 mass %.

Preparation of Paint

The second agent was added in the above prepared first agent (urethane polyol) in the NCO/OH ratio shown in Tables 5 and 6, to prepare the paint.

7. Formation of Paint Film

The surface of the golf ball bodies obtained above was treated with sandblast and marked. The paint was applied with a spray gun, and dried for 24 hours in an oven at 40° C. to obtain golf balls having a diameter of 42.7 mm and a mass of 45.3 g. The paint film had a thickness of 20 μm. The application of the paint was conducted as follows. The golf ball body was placed in a rotating member provided with three prongs, and the rotating member was allowed to rotate at 300 rpm. The application of the paint was conducted by spacing a spray distance (7 cm) between the air gun and the golf ball body, and moving the air gun in an up and down direction. The painting interval in the overpainting operation was set to 1.0 second. The application of the paint was conducted under the spraying conditions of overpainting operation: twice, spraying air pressure: 0.15 MPa, compressed air tank pressure: 0.10 MPa, painting time per one application: one second, atmosphere temperature: 20° C. to 27° C., and atmosphere humidity: 65% or less. Evaluation results of the obtained golf balls are shown in Tables 5 and 6.

TABLE 5

| | | | Golf ball No. | | | | | | | | |
|---|---|---|---|---|---|---|---|---|---|---|---|
| | | | 1 | 2 | 3 | 4 | 5 | 6 | 7 | 8 | 9 |
| Paint | First agent | Urethane polyol No. | 2 | 3 | 3 | 3 | 3 | 3 | 3 | 3 | 3 |
| | | Number average molecular weight of PTMG | 850 | 1000 | 1000 | 1000 | 1000 | 1000 | 1000 | 1000 | 1000 |
| | | Second agent (polyisocyanate composition) No. | 1 | 1 | 1 | 1 | 2 | 2 | 2 | 3 | 3 |
| | | Second agent/first agent (NCO/OH molar ratio) | 1.0 | 1.0 | 1.5 | 2.0 | 1.0 | 1.5 | 2.0 | 1.0 | 1.5 |
| | | Solid component content (mass %) | 30 | 30 | 32 | 33 | 30 | 32 | 33 | 30 | 32 |
| Property of paint film | | 10% Elastic modulus (kgf/cm$^2$) | 10 | 13 | 48 | 85 | 11 | 30 | 73 | 10 | 17 |
| | | E' (10$^8$ Pa, 0° C., 10 Hz) | 5.3 | 3.7 | 6.2 | 8.3 | 3.5 | 6.2 | 8.3 | 5 | 8.1 |
| | | E" (10$^8$ Pa, −50° C., 10 Hz) | 1.1 | 1.23 | 1.35 | 1.25 | 1.04 | 1.19 | 1.19 | 1.04 | 1.01 |
| Evaluation of golf ball | | Dry spin rate Sd (rpm) | 5013 | 4981 | 4990 | 4988 | 4943 | 4964 | 4983 | 4951 | 4955 |
| | | Rough spin rate Sr (rpm) | 3894 | 3900 | 3950 | 3890 | 3815 | 3856 | 3823 | 3869 | 3821 |
| | | Retention ratio Sr/Sd (%) | 78 | 78 | 79 | 78 | 77 | 78 | 77 | 78 | 77 |

TABLE 6

| | | | Golf ball No. | | | | | | | | | | |
|---|---|---|---|---|---|---|---|---|---|---|---|---|---|
| | | | 10 | 11 | 12 | 13 | 14 | 15 | 16 | 17 | 18 | 19 | 20 |
| Paint | First agent | Urethane polyol No. | 3 | 4 | 5 | 3 | 3 | 3 | 1 | 1 | 1 | 5 | 3 |
| | | Number average molecular weight of PTMG | 1000 | 1500 | 2000 | 1000 | 1000 | 1000 | 650 | 650 | 650 | 2000 | 1000 |

TABLE 6-continued

|  |  | Golf ball No. | | | | | | | | | | |
|---|---|---|---|---|---|---|---|---|---|---|---|
|  |  | 10 | 11 | 12 | 13 | 14 | 15 | 16 | 17 | 18 | 19 | 20 |
|  | Second agent (polyisocyanate composition) No. | 3 | 1 | 1 | 4 | 4 | 4 | 5 | 4 | 4 | 1 | 1 |
|  | Second agent/first agent (NCO/OH molar ratio) | 2.0 | 2.0 | 2.0 | 0.5 | 1.0 | 1.5 | 1.2 | 0.7 | 1.0 | 0.7 | 4.0 |
|  | Solid component content (mass %) | 33 | 34 | 35 | 29 | 30 | 32 | 33 | 30 | 31 | 32 | 35 |
| Property of paint film | 10% Elastic modulus (kgf/cm$^2$) | 75 | 22 | 19 | 3 | 80 | 221 | 280 | 70 | 165 | <1 | 304 |
|  | E' (10$^8$ Pa, 0° C., 10 Hz) | 10 | 2.9 | 2.9 | 3.3 | 9.5 | 16 | 22 | 14 | 15 | 0.45 | 16 |
|  | E" (10$^8$ Pa, −50° C., 10 Hz) | 1.14 | 1.1 | 1.05 | 1.1 | 1.06 | 1.02 | 0.92 | 0.72 | 0.73 | 1.19 | 1.21 |
| Evaluation of golf ball | Dry spin rate Sd (rpm) | 4996 | 5031 | 4965 | 4981 | 5032 | 5013 | 4890 | 4972 | 4981 | 4950 | 4920 |
|  | Rough spin rate Sr (rpm) | 3799 | 3941 | 3865 | 3789 | 3755 | 3590 | 3420 | 3500 | 3460 | 3610 | 3580 |
|  | Retention ratio Sr/Sd (%) | 76 | 78 | 78 | 76 | 75 | 72 | 70 | 70 | 69 | 73 | 73 |

The golf balls No. 1 to No. 15, 19 and 20 are golf balls comprising a golf ball body and a paint film composed of at least one layer and formed on a surface of the golf ball body, wherein a base resin constituting an outermost layer of the paint film is a polyurethane obtained by a reaction between (A) a polyol composition and (B) a polyisocyanate composition, and a loss modulus (E") at the temperature of −50° C. obtained by measuring a dynamic viscoelasticity of the polyurethane is 1.00×10$^8$ Pa or more. The golf balls No. 1 to No. 15, 19 and 20 have excellent spin performance.

The present invention is preferably applicable to a painted golf ball.

This application is based on Japanese patent applications No. 2018-236983 filed on Dec. 19, 2018 and No. 2019-155871 filed on Aug. 28, 2019, the contents of which are hereby incorporated by reference.

The invention claimed is:

1. A golf ball comprising a golf ball body and a paint film composed of at least one layer and formed on a surface of the golf ball body, wherein
a base resin constituting an outermost layer of the paint film is a polyurethane obtained by a reaction between (A) a polyol composition and (B) a polyisocyanate composition,
(A) the polyol composition contains a urethane polyol, the urethane polyol includes a polyether diol having a number average molecular weight in a range of from 800 to 3000 as a constituent component, and an amount of the polyether diol in the urethane polyol is 55 mass % or more and 65 mass % or less, and
a loss modulus (E") at the temperature of −50° C. obtained by measuring a dynamic viscoelasticity of the polyurethane under following conditions is 1.00×10$^8$ Pa or more:
<measurement conditions>
measuring mode: sine wave tensile mode
measuring temperature range: −120° C. to 100° C.
temperature increasing rate: 3° C. /min
oscillation frequency: 10 Hz
measuring strain: 0.05%.

2. The golf ball according to claim 1, wherein the loss modulus (E") of the paint film is 1.20×10$^8$ Pa or more.

3. The golf ball according to claim 1, wherein (B) the polyisocyanate composition contains an isocyanurate-modified product of a diisocyanate as a polyisocyanate component.

4. The golf ball according to claim 3, wherein the diisocyanate is hexamethylene diisocyanate.

5. The golf ball according to claim 1, wherein the loss modulus (E") of the paint film is 1.00×10$^9$ Pa or less.

6. The golf ball according to claim 1, wherein a 10% elastic modulus of the paint film is 130 kgf/cm$^2$ or less.

7. The golf ball according to claim 1, wherein the polyether diol is polyoxytetramethylene glycol.

8. The golf ball according to claim 1, wherein the urethane polyol further includes a triol as a constituent component, and a mixing ratio of the triol to the polyether diol (triol/polyether diol) ranges from 1.0 to 2.6 in a molar ratio of OH group.

9. The golf ball according to claim 8, wherein the triol is trimethylolpropane.

10. The golf ball according to claim 1, wherein
the urethane polyol has a number average molecular weight ranging from 5000 to 20000, and
the paint film is composed of at least two layers, and a base resin constituting a layer other than the outermost layer of the paint film includes at least one member selected from the group consisting of an epoxy resin, and an acrylic resin.

11. The golf ball according to claim 1, wherein the urethane polyol has a hydroxyl value ranging from 10 mgKOH/g to 200 mgKOH/g.

12. The golf ball according to claim 1, wherein a molar ratio (NCO group/OH group) of isocyanate groups (NCO groups) included in (B) the polyisocyanate composition to hydroxyl groups (OH groups) included in (A) the polyol composition ranges from 0.7 to 3.5.

13. The golf ball according to claim 1, wherein (B) the polyisocyanate composition contains only one polyisocyanate selected from the group consisting of an isocyanurate-modified product of hexamethylene diisocyanate, a biuret-modified product of hexamethylene diisocyanate, an adduct product of hexamethylene diisocyanate, and an isocyanurate-modified product of isophorone diisocyanate, as a polyisocyanate component.

14. The golf ball according to claim 1, a storage modulus (E') at the temperature of 0° C. obtained by measuring a dynamic viscoelasticity of the polyurethane under following conditions is 0.5×10$^8$ Pa or more and 15×10$^8$ Pa or less:
<measurement conditions>
measuring mode: sine wave tensile mode
measuring temperature range: −120° C. to 100° C.
temperature increasing rate: 3° C. /min
oscillation frequency: 10 Hz
measuring strain: 0.05%.

15. The golf ball according to claim 1, wherein (B) the polyisocyanate composition contains only an isocyanurate-modified product of hexamethylene diisocyanate as a polyisocyanate component.

16. A golf ball comprising a golf ball body and a paint film composed of at least one layer and formed on a surface of the golf ball body, wherein
- a base resin constituting an outermost layer of the paint film is a polyurethane obtained by a reaction between (A) a polyol composition and (B) a polyisocyanate composition,
- a molar ratio (NCO group/OH group) of isocyanate groups (NCO groups) included in (B) the polyisocyanate composition to hydroxyl groups (OH groups) included in (A) the polyol composition ranges from 1.3 to 1.5,
- a 10% elastic modulus of the outermost layer of the paint film is 2 kgf/cm$^2$ or more and 48 kgf/cm$^2$ or less, and
- a loss modulus (E") at the temperature of −50° C. obtained by measuring a dynamic viscoelasticity of the polyurethane under following conditions is $1.00 \times 10^8$ Pa or more:

<measurement conditions>
measuring mode: sine wave tensile mode
measuring temperature range: −120° C. to 100° C.
temperature increasing rate: 3° C. /min
oscillation frequency: 10 Hz
measuring strain: 0.05%.

17. The golf ball according to claim 16, wherein the 10% elastic modulus of the outermost layer of the paint film is 30 kgf/cm$^2$ or less.

* * * * *